(12) United States Patent
Jordan et al.

(10) Patent No.: US 9,793,690 B2
(45) Date of Patent: Oct. 17, 2017

(54) APPARATUS FOR PUSHING CONDUCTORS INTO CONDUIT AND OTHER STRUCTURES

(71) Applicant: Southwire Company, LLC, Carrollton, GA (US)

(72) Inventors: David Scott Jordan, Knoxville, TN (US); Michael Calvin Jordan, Knoxville, TN (US)

(73) Assignee: Southwire Company, LLC, Carrollton, GA (US)

( * ) Notice: Subject to any disclaimer, the term of this patent is extended or adjusted under 35 U.S.C. 154(b) by 457 days.

(21) Appl. No.: 13/785,496

(22) Filed: Mar. 5, 2013

(65) Prior Publication Data
US 2013/0248785 A1   Sep. 26, 2013

Related U.S. Application Data

(63) Continuation of application No. 12/767,214, filed on Apr. 26, 2010, now Pat. No. 8,408,520.

(51) Int. Cl.
*H02G 1/08* (2006.01)
*B65H 51/10* (2006.01)

(52) U.S. Cl.
CPC .............. *H02G 1/08* (2013.01); *B65H 51/10* (2013.01); *H02G 1/085* (2013.01); *H02G 1/086* (2013.01)

(58) Field of Classification Search
CPC  H02G 1/08; H02G 1/06; H02G 1/086; H02G 1/085; B65H 51/06; B65H 51/00
USPC ............ 254/134.3 FT, 13.43 R, 134.4, 134.5
See application file for complete search history.

(56) References Cited

U.S. PATENT DOCUMENTS

| | | | | |
|---|---|---|---|---|
| 2,754,958 A | * | 7/1956 | Murrell | B27F 7/28 226/11 |
| 3,037,744 A | | 6/1962 | Cooper | |
| 3,610,582 A | * | 10/1971 | Passoni | H02G 1/085 254/134.3 FT |
| 4,549,347 A | * | 10/1985 | Travlos | B23P 19/04 226/146 |
| 4,835,990 A | | 6/1989 | Zorini | |
| 5,497,928 A | * | 3/1996 | Burns | B65H 51/10 226/108 |

(Continued)

OTHER PUBLICATIONS

U.S. Official Action mailed on Jul. 2, 2012 in U.S. Appl. No. 12/767,214.

(Continued)

*Primary Examiner* — Monica Carter
*Assistant Examiner* — Seahee Yoon
(74) *Attorney, Agent, or Firm* — Hartman & Citrin LLC

(57) ABSTRACT

An apparatus and methods for pushing conductors into conduit and other structures are disclosed. The apparatus ("pusher") can include rollers to apply a pushing force to one or more conductors or bundles of conductors. One or more rollers can be coupled to a drive mechanism. The pusher is configured to pull conductors or bundles of conductors off of one or more spools, and push the conductors or bundles of conductors without de-bundling or sorting the conductors. The conductors can be fed through the pusher in any format including side-by-side, vertical on top of one another, twisted together, or other formats. The pusher can include a guiding device that is configured to route the conductors from the pusher to a conduit through which the conductors are being pushed or pulled.

19 Claims, 7 Drawing Sheets

(56) References Cited

U.S. PATENT DOCUMENTS

| | | | |
|---|---|---|---|
| 5,507,471 A | 4/1996 | Mercurio | |
| 5,681,131 A | 10/1997 | Goldenberg et al. | |
| 5,692,662 A * | 12/1997 | Fladl et al. | 254/134.3 FT |
| 5,749,565 A * | 5/1998 | Frost | G02B 6/4459 |
| | | | 254/134.4 |
| 5,816,466 A * | 10/1998 | Seufer | B23K 9/1333 |
| | | | 226/187 |
| 5,984,273 A | 11/1999 | Ray | |
| 5,996,971 A | 12/1999 | Crouse | |
| 6,003,842 A * | 12/1999 | Hug | H02G 1/08 |
| | | | 254/134.3 FT |
| 6,073,916 A * | 6/2000 | Plummer | H02G 1/08 |
| | | | 226/182 |
| 6,286,815 B1 | 9/2001 | Ray | |
| 6,361,021 B1 | 3/2002 | Brennan | |
| 6,364,290 B1 * | 4/2002 | Barker | 254/134.4 |
| 6,386,512 B1 | 5/2002 | Pecot et al. | |
| 6,398,147 B1 | 6/2002 | Fredrickson | |
| 6,513,791 B1 | 2/2003 | Yates | |
| 6,682,050 B1 | 1/2004 | Ray | |
| 6,691,985 B1 | 2/2004 | El Haddad | |
| 6,705,597 B1 | 3/2004 | Reilly et al. | |
| 6,769,669 B2 | 8/2004 | Cook et al. | |
| 7,044,415 B2 | 5/2006 | Wiesemann et al. | |
| 7,070,168 B2 | 7/2006 | Plummer | |
| 7,309,060 B2 | 12/2007 | Baughman et al. | |
| 7,384,023 B2 | 6/2008 | Plummer | |
| 7,687,742 B2 * | 3/2010 | Belfiore | B23K 9/1336 |
| | | | 219/137.7 |
| 8,025,261 B2 | 9/2011 | Jordan et al. | |
| 8,056,884 B2 | 11/2011 | LaFreniere | |
| 8,074,968 B2 | 12/2011 | Cherix et al. | |
| 8,091,866 B2 | 1/2012 | White | |
| 8,246,009 B2 | 8/2012 | Plummer | |
| 8,292,267 B2 | 10/2012 | Jordan et al. | |
| 8,308,138 B1 | 11/2012 | Jordan et al. | |
| 8,434,742 B2 | 5/2013 | Akhavein et al. | |
| 8,496,229 B1 | 7/2013 | Mayhall | |
| 2006/0219992 A1* | 10/2006 | Fee | H02G 1/086 |
| | | | 254/134.4 |
| 2009/0065753 A1* | 3/2009 | Gonen | H02G 1/08 |
| | | | 254/93 R |
| 2009/0166597 A1* | 7/2009 | Weaver | G02B 6/4466 |
| | | | 254/134.3 R |
| 2009/0236575 A1* | 9/2009 | Cherix | H02G 1/085 |
| | | | 254/134.4 |
| 2010/0065798 A1 | 3/2010 | Spells, Jr. | |
| 2010/0090183 A1 | 4/2010 | Leto et al. | |
| 2010/0102286 A1 | 4/2010 | Jordan et al. | |
| 2011/0057157 A1 | 3/2011 | Holley | |
| 2011/0094042 A1 | 4/2011 | Li | |
| 2012/0023723 A1* | 2/2012 | Barker | H02G 1/086 |
| | | | 29/407.05 |
| 2012/0061633 A1 | 3/2012 | Holley | |

OTHER PUBLICATIONS

U.S. Notice of Allowance mailed on Nov. 8, 2012 in U.S. Appl. No. 12/767,214.

Canadian Office Action dated May 11, 2017 issued in Canadian Patent Application No. 2,735,611.

* cited by examiner

APPARATUS FOR PUSHING CONDUCTORS INTO CONDUIT AND OTHER STRUCTURES

CROSS REFERENCE TO RELATED APPLICATIONS

This application is a continuation of U.S. patent application Ser. No. 12/767,214 filed Apr. 26, 2010 entitled "Apparatus for Pushing Conductors Into Conduit and Other Structures," now U.S. Pat. No. 8,408,520, which is hereby incorporated by reference herein in its entirety.

BACKGROUND

The present disclosure is directed to methods and apparatuses for pushing conductors. More particularly, the present disclosure is directed to a pusher for pushing conductors into conduit and other structures.

Electrical needs of modern facilities such as houses, apartment buildings, warehouses, manufacturing facilities, office buildings, and the like, have increased as the use of electrical devices has increased. During construction of many buildings, particularly commercial space, conduit is often run between electrical panels and anticipated power consumption sites to comply with various building codes and/or for safety or efficiency considerations. Conductors are typically pulled through the conduit after the conduit is in place.

Special tools exist for pulling conductors through conduit including wire pullers and other devices. In practice, a rope or wire is often threaded through a conduit, and a number of conductors are attached to the rope or wire with tape or other attachment mechanisms. The rope is pulled back through the conduit with the conductors attached thereto, thus pulling one end of the conductors to a desired location. Typically, manpower is needed on both ends of the conduit during a conductor pull; one or more people to pull the conductors, and one or more people to feed the conductors into the conduit to prevent tangling, snagging, and/or other damage to the conductors. Due to the increasing electrical needs of modern homes and businesses, pulling conductors through conduit is a time consuming and labor intensive task that may occupy a growing percentage of construction projects.

It is with respect to these and other considerations that the disclosure made herein is presented.

SUMMARY

The present disclosure is directed to an apparatus for pushing conductors into conduit and other structures. The apparatus ("pusher") can include a drive roller and one or more rollers for cooperating with the drive roller to apply a pushing force to one or more conductors or bundles of conductors. The drive roller can be coupled to a drive mechanism such as a motor and gearbox. One or more of the rollers can be connected to the drive roller with a chain, belt, gears, or other mechanisms such that the one or more rollers are powered by the drive mechanism as well.

The pusher is configured to pull conductors or bundles of conductors off of one or more spools, and push the conductors or bundles of conductors without de-bundling or sorting the conductors. The conductors can be fed through the pusher in any format including side-by-side, vertical on top of one another, twisted together, or other formats. Additionally, the pusher is configured to grip conductors of varied sizes and with varied coatings including small gauge conductors, and "no-lube" conductors that are impregnated or coated with lubrication. The pusher is further configured to push conductors with or without a pulling rope attached to the conductors.

The pusher can include a guiding device that is configured to route the conductors from the pusher to a conduit through which the conductors are being run, i.e., pushed or pulled. The guiding device can include an inlet, a tube, and an outlet. The tube can be flexible or semi-rigid, and can route the conductor into a conduit without requiring manpower between the pusher and the conduit. The pusher can also include remote controls for controlling one or more pushers and pullers simultaneously to accommodate various safety and efficiency considerations.

This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to methods, systems, and apparatuses for pushing conductors through conduit and other structures. This description provides various components, one or more of which may be included in particular implementations of the systems and apparatuses disclosed herein. In illustrating and describing these various components, however, it is noted that implementations of the embodiments disclosed herein may include any combination of these components, including combinations other than those shown in this description.

Figure 1:
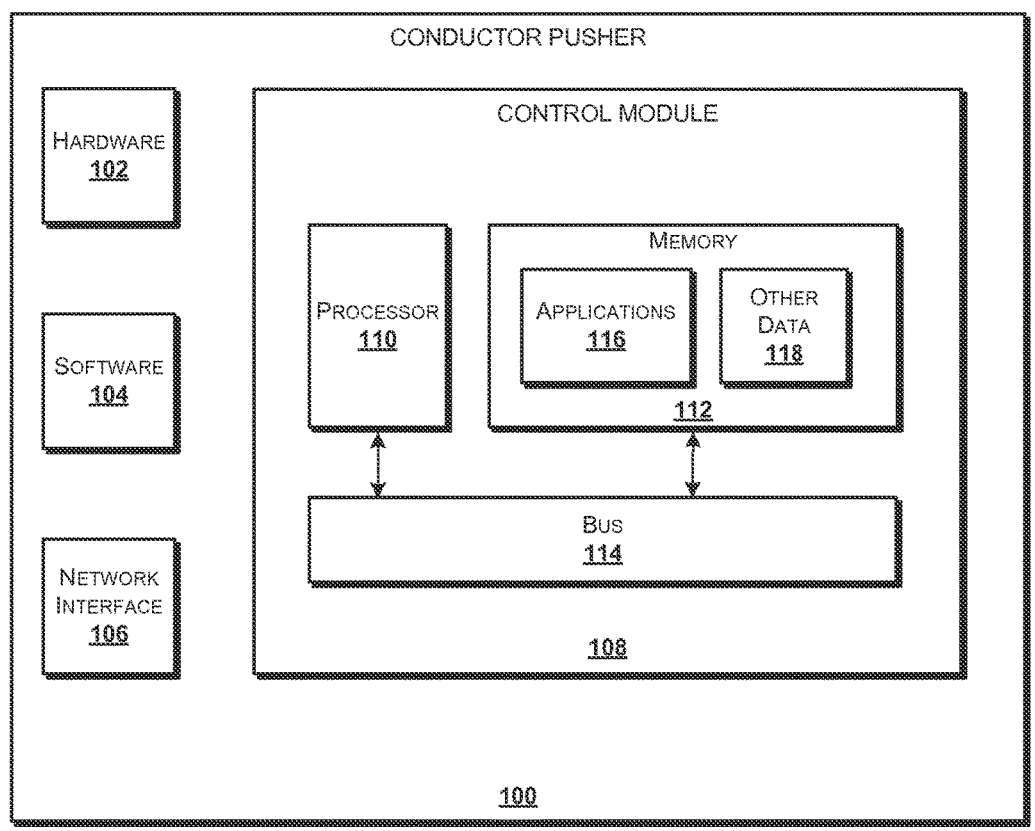
FIG. 1 is a block diagram schematically illustrating a conductor pusher, according to exemplary embodiments.

FIG. 1 is a block diagram schematically illustrating a conductor pusher 100, according to an exemplary embodiment. In the illustrated embodiment, the pusher 100 includes one or more hardware components 102 ("hardware"), one or more software components 104 ("software"), one or more network interfaces 106, and one or more control modules 108. The hardware 102 can include hardware components of the pusher 100. As will be explained below with reference to FIGS. 2-7, the hardware 102 can include, but is not limited to, one or more rollers, one or more drives, any number of guides, dividers, height/tension adjustment mechanisms, supports, guiding devices, gears, chains, and/or other hardware. The software 104 can include software components of the pusher 100. The software 104 can include, but is not limited to, applications, routines, subroutines, programs, computer-readable instructions, computer-executable instructions, and the like, for controlling various functions of the pusher 100.

The network interface 106 can be operatively linked and in communication with one or more communications networks such as, for example, private networks, the Internet, cellular communications networks, wireless area networks, an intranet, other networks, combinations thereof, and the like. The network interface 106 can be used to communicate with other devices and/or networks. It should be understood that the pusher 100 can be configured to communicate any desired information to another device via the network interface 106. In some embodiments, the network interface 106 includes a wireless transmitter for communicating with a remote control with which an operator controls the pusher 100. It should be understood that this embodiment is illustrative, and that the remote control can communicate with the pusher 100 via hardware other than the network interface 106.

The control module 108 can be used to control the functions of the pusher 100. The control module 108 can include one or more processors 110, which can be operatively linked and in communication with one or more memory devices 112 via one or more data/memory busses 114. The processor 110 can execute computer-readable instructions stored in the memory 112. Execution of the computer-readable instructions can cause the pusher 100 to perform various functions, for example, the functionality of the pusher 100 described herein. Although the control module 108 is illustrated as a separate entity, with respect to the hardware 102 and the software 104, it should be understood that the functions described with respect to the control module 108 can be performed by the hardware 102 and the software 104. For example, the hardware 102 can include a memory and a processor, and the software 104 can include applications 116 and other data 118 illustrated in the memory 112. As such, it must be understood that the illustrated configuration is exemplary, and is described in the presented manner for ease of description.

The words "memory" and "storage device," as used herein collectively include, but are not limited to, processor registers, processor cache, random access memory (RAM), other volatile and non-volatile memory devices, semi-permanent or permanent memory types; for example, tape-based media, optical media, flash media, hard disks, combinations thereof, and the like. While the memory 112 is illustrated as residing proximate to the processor 110, it should be understood that the memory 112 can be a remotely accessed storage system, for example, a server and/or database on a communications network, a remote hard disk drive, a removable storage medium, a database, a server, an optical media writer, combinations thereof, and the like. Moreover, the memory 112 is intended to encompass network memory and/or other storage devices in wired or wireless communication with the pusher 100, which may utilize the network interface 106 to facilitate such communication. Thus, any of the data, applications, and/or software described below can be stored within the memory 112, the software 104, and/or accessed via network connections to other data processing systems (not shown) that may include a local area network (LAN), a metropolitan area network (MAN), a wide area network (WAN), and the like, for example.

The applications 116 can include various programs, routines, subroutines, algorithms, software, tools, and the like ("instructions"), for operating the pusher 100; calibrating various components of the pusher 100; tuning one or more drive mechanisms of the pusher 100; adjusting the speed of the pusher 100; safety applications and controls of the pusher 100; reporting and recording modules; and the like, as well as programs or applications to make the pusher 100 operable to perform any of the functions described below. The applications 116 also can include instructions used to operate the pusher 100 and/or devices connected to the pusher 100, if any. The instructions can include, for example, operating systems, firmware, drivers for peripherals, and the like. The other data 118 can include, for example, usage data and statistics, other programs or software, and the like.

While the above description of the pusher 100 has described various forms of computer executable instructions, e.g., the software 104 and the applications 116, it should be understood that the software 104 and/or applications 116 can be omitted, and that the pusher 100 can be controlled by one or more hardware controls. In some embodiments, for example, the pusher 100 is controlled by a power switch or a variable drive switch. These examples are illustrative, and should not be construed as being limiting.

Figure 2:
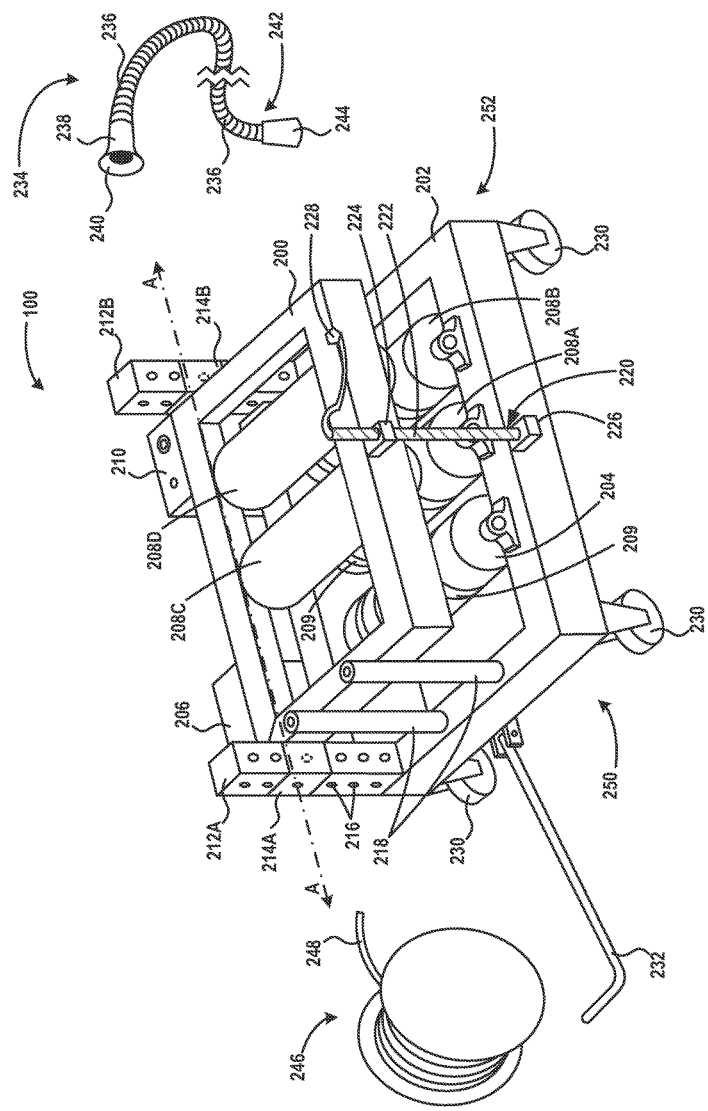
FIG. 2 is an isometric drawing illustrating a conductor pusher, according to an exemplary embodiment.

Turning now to FIG. 2, an exemplary embodiment of the pusher 100 will be described. The pusher 100 includes a top portion 200 and bottom portion 202. In some embodiments, the top portion 200 and the bottom portion 202 include a top frame and a bottom frame, respectively. The top portion 200 and/or the bottom portion 202 may be formed from any suitable material including, but not limited to, steel, aluminum, carbon composite, or other materials. It should be understood that the top portion 200 and the bottom portion 202 can be solid structures, and therefore may be configured as substantially planar structures. Additionally, or alternatively, the top portion 200 and the bottom portion 202 can include a frame with a plate, grid, fencing, or other material, if desired, which can reduce the total weight and/or cost of the pusher 100. In the illustrated embodiment, the top portion 200 is a frame with a grid panel disposed at the top layer to protect a user from moving parts. In the illustrated view, however, the grid panel has been removed for allowing a clear view of the pusher 100. This view is merely exemplary, and should not be construed as being limiting in any way.

The bottom portion 202 includes a drive roller 204 coupled to a drive 206. In some embodiments, the drive 206 includes a motor and a gearbox, though other structures are contemplated. The motor and the gearbox of the drive 206 can be selected and sized according to desired performance characteristics, preferences, and/or requirements. Thus, the drive 206 can include any desired motor type and design, and can be sized according to any desired considerations. Similarly, the gearbox can include a worm gear, a transmission, or other gears. The gearbox can be selected and sized according to anticipated needs, loads, and/or applications. In some embodiments, the components of the drive 206 are selected to provide the pusher 100 with high-torque, high-speed feed capabilities. It should be understood that the above embodiments are exemplary.

The bottom portion 202 also can include rollers 208A and 208B, which may be coupled to the drive roller 204 via one or more chains, belts, gears, combinations thereof, and the like (not illustrated in FIG. 2). The drive roller 204 and the rollers 208A, 208B can cooperate with rollers 208C and 208D on the top portion 200 to provide the functionality described herein. It should be understood that none, some, or all of the rollers 208A-D can be coupled to additional motors or other drive mechanisms, and can be coupled to the drive 206 and the drive roller 204, if desired. In some embodiments, one or more of the drive roller 204 and the rollers 208A-D are grooved rollers with grooves 209, as will be explained below.

The rollers can be formed from metal, plastic, rubber, other materials, and/or combinations thereof. In one embodiment, the drive roller 204 and the rollers 208A, 208B are six-inch grooved rollers on eight-inch centers with a one-inch shaft, and are connected to the bottom portion 202 using pillow block bearings. In some embodiments, the rollers 204, 208A-D are designed to accommodate conductors of various gauges, to accommodate a number of conductors in a bundle or arranged side-by-side, and/or to accommodate "no lube" conductors. For example, grooves 209 of a grooved roller design can be employed to allow the pusher 100 to grip the "no lube" conductors and/or conductors of various gauges. Additionally, the grooves 209 of the grooved roller design can be employed to allow the pusher 100 to simultaneously feed multiple conductors of various gauges, which may be oriented in bundles and/or arranged side by side.

The rollers 208C, 208D can be six-inch profiled rollers on 8-inch centers with a one inch shaft, and are connected to the top portion 200 using pillow block bearings. The rollers 208C, 208D are arranged on the top portion 200 such that the roller 208C is centered in a gap between the drive roller 204 and the roller 208A, and the roller 208D is centered in a gap between the rollers 208A and 208B. This arrangement is illustrative, and should not be construed as being limiting in any way. The rollers 204, 208A-D can be arranged and/or configured in various arrangements and configurations depending upon the desired performance characteristics. Some exemplary roller configurations are illustrated below with reference to FIGS. 5A-5C.

The pusher 100 and/or the drive 206 thereof can be controlled by a controller 210. The controller 210 can include, or can be substituted by, the functionality of the control module 108 described above with reference to FIG. 1. Additionally, the controller 210 can include a master power switch, a safety lock, a variable drive control switch, a plug for insertion in a power outlet or other power source, and/or other controls (not illustrated). The controller 210 can be linked and/or in communication with the drive 206, and can be used to activate, deactivate, enable, and disable the drive 206, if desired.

The pusher 100 can include supports 212A, 212B for supporting the top portion 200 and/or for joining the top portion 200 to the bottom portion 202. In some embodiments, the top portion 200 couples to one or more of the supports 212A, 212B via one or more sleeves, plates, and/or lock selector mechanisms 214A, 214B. In the illustrated embodiment, the supports 212A, 212B are formed from steel, and a number of through holes 216 are formed in the supports 212A, 212B. In some contemplated embodiments, sleeves are formed on the top portion 200. The sleeves can be configured to slide over and/or down the supports 212A, 212B, and can include one or more apertures. The lock selector mechanisms 214A, 214B can include cotter pins, hitch pins, R-clips, linchpins, bolts, screws, rivets, nails, and/or other mechanisms that can interface with the supports 212A, 212B. In some embodiments, the lock selector mechanisms 214A, 214B are hitch pins that pass through the apertures in the sleeves and/or a plate connected to the top portion 200, and through the through holes 216. The lock selector mechanisms 214A, 214B are locked to hold the top portion 200 in a desired position.

The top portion 200 and/or the bottom portion 202 also can include guides 218 (illustrated on the bottom portion 202 in FIG. 2). The guides 218 can be used to guide conductors into the rollers 204, 208A-D and/or to guide the conductors out of the rollers 204, 208A-D to prevent the conductors from contacting any structure outside of the area bound by the guides 218. The guides 218 can help prevent the conductors from getting tangled, cut, snagged, or otherwise damaged during feeding or pushing. The guides 218 can be formed from any desired materials and in any desired configuration. In some embodiments, the guides 218 include rollers. The rollers can be formed from steel, rubber, plastic, carbon composite, aluminum, or other materials. In some embodiments, the rollers are formed from ESD-safe plastics and bearings to reduce the risk of electrostatic discharge ("ESD") in facilities handling ESD-sensitive goods. These examples are illustrative.

The pusher 100 also can include a height/tension adjustment mechanism 220 for adjusting the distance and/or tension between the top portion 200 and the bottom portion 202. In some embodiments, adjustment of the distance/tension between the top portion 200 and the bottom portion 202 also adjusts the distance/tension between the rollers 204, 208A, 208B at the bottom portion 202 and the rollers 208C, 208D at the top portion 200. It should be appreciated that in some embodiments, the entire top portion 200 is moved along the supports 212A, 212B to adjust the distance between the top portion 200 and the bottom portion 202. In some embodiments, the height/tension adjustment mechanism 220 may be used solely for adjusting the tension between the rollers 204, 208A-D.

The distance between the rollers 204, 208A, 208B and the rollers 208C, 208D can be adjusted to accommodate one or more conductors of various diameters and/or bundles of conductors, the speed at which the conductors or bundles of conductors are pushed through the pusher 100, the amount of slippage between the conductors or bundles of conductors and the rollers 204, 208A-D, and for other purposes. It should be understood that the rollers 204, 208A-D further may include position adjustment mechanisms to allow users to adjust the horizontal and/or vertical position of one or more of the rollers 204, 208A-D.

The height/tension adjustment mechanism 220 can include any suitable structures for adjusting the distance/tension between the top portion 200 and the bottom portion 202. In some embodiments, the height/tension adjustment mechanism 220 includes a rod or threaded screw 222 ("rod") that passes through a plate 224 on the top portion 200, and engages a sleeve or threaded nut 226 ("sleeve") on the bottom portion 202. In the illustrated embodiment, the rod 222 includes a handle 228 for turning the rod 222, and thereby adjusting the tension between the top portion 200 and the bottom portion 202. In some embodiments, the sleeve 226 is replaced with a plate, and the rod 222 is replaced with a stow bolt or other threaded bolt. The tension between the top portion 200 and the bottom portion 202 may be adjusted by a wing nut or other device placed on the threaded portion of the stow bolt. These examples are illustrative, and should not be construed as being limiting in any way.

The pusher 100 also can include casters 230. In some embodiments, the casters 230 are inflatable tires. The pusher 100 can include feet or stands in addition to, or instead of, the casters 230. The pusher 100 also can include a handle 232 for moving, bracing, and/or towing the pusher 100.

In some embodiments, the pusher 100 includes a guiding device 234. The guiding device 234 includes a body 236 ("tube"). The tube 236 can be rigid, semi-rigid, or flexible. In the illustrated embodiment, the tube 236 is a flexible tubular structure formed from galvanized steel or aluminum, though other materials and degrees of rigidity are contemplated. The guiding device 234 includes an inlet/throat portion 238 ("inlet") through which pushed conductors enter the guiding device 234. In some embodiments, the inlet 238 is formed with dimensions that are substantially similar to the tube 236. In some embodiments, the inlet 238 has a first diameter at one end and a second diameter at a second end. Thus, the inlet 238 may be funnel- or nozzle-shaped, if desired. In the illustrated embodiment, a leading edge 240 of the inlet 238 is formed as a smooth edge to prevent snagging, tearing, ripping, bending, or otherwise damaging conductors being passed into or through the guiding device 234. The inlet 238 is illustrated and described in more detail below with reference to FIGS. 6A-6B.

The guiding device 234 also includes an outlet portion 242 ("outlet") through which pushed conductors exit the guiding device 234 and enter into a conduit (not illustrated), if desired. The outlet 242 can include an outlet assembly 244, which can interface with a conduit. In some embodiments, a conduit guiding device adapter or other suitable device (not illustrated) is used to allow mating between the conduit and the outlet 242 or outlet assembly 244 of the guiding device. The conduit guiding device adapter can be coupled to a conduit through which the conductor is to be pushed, and the outlet assembly 244 of the guiding device 234 can be attached to a conduit guiding device adapter or other device that couples the outlet 242 of the guiding device 234 to an inlet portion of the conduit.

The guiding device 234 can be connected to the pusher 100 using any suitable device. In one embodiment, the guiding device 234 is connected to the pusher using a chain vise. In other embodiments, the guiding device 234 is bolted, welded, or clamped to the pusher 100 or a component thereof. These embodiments are illustrative.

As illustrated in FIG. 2, one or more reels or spools 246 ("spools") of conductors 248 can be positioned proximate to the pusher 100. It should be appreciated that the conductors 248 can include one or more bundles of conductors 248. The conductors 248 can be pre-bundled and wound onto the spools 246 in bundled form, if desired. Alternatively, conductors 248 from two or more spools 246 can be simultaneously fed into the pusher 100. It further should be understood that more than one guiding device 234 may be used with the pusher 100. For example, the pusher 100 may be used to push two or more conductors 248, bundles of conductors 248, and/or combinations thereof. Some of the conductors 248 may be pushed by the pusher 100 into a first guiding device 234, and some of the conductors 248 may be simultaneously pushed by the pusher 100 into another guiding device. Thus, the illustrated embodiment is illustrative, and should not be construed as being limiting in any way.

In operation, one or more conductors 248 or bundles thereof are fed into an inlet end 250 of the pusher 100, and passed into or through the rollers 204, 208A-D. As will be explained in more detail below with reference to FIG. 7, some embodiments employ the use of a puller or another pusher that operates in concert with the pusher 100. Thus, as is generally known, a pulling rope can first be pulled through a conduit or other structure through which the conductors 248 are to be pushed, and the pulling rope can be attached to the conductors 248 and fed through a puller or pusher on the destination end of the conduit. In other embodiments, no puller or second pusher is used. Regardless of whether a puller or second pusher is used, the conductors 248 can be passed into the pusher 100 between the guides 218, or two or more conductors 248 can be passed into the pusher 100, and the guides 218 can be used as dividers between the fed conductors 248.

In some embodiments, the top portion 200 is removed from the pusher or rotated out of position while the conductors 248 are put into position for operation of the pusher 100. Thus, although not visible in FIG. 2, the top portion 200 can include pivot mechanisms that allow the top portion 200 to rotate. In the illustrated embodiment, the top portion 200 includes pivot mechanisms that allow the top portion 200 to rotate about an axis A. The pivot mechanisms can include pins, rods, hinges, combinations thereof, and the like. The conductors 248, and/or a pulling rope or wire, if used, can be placed in the pusher 100, such that an end of the conductors 248 is extended past the pusher 100. The conductors 248 can be manually fed into the guiding device 234, if desired. The top portion 200 can be rotated back into position and the height/tension adjustment mechanism 220 can be used to adjust the tension of the pusher 100. Alternatively, the conductors 248 can be fed into contact with drive roller 204 and one or more of the rollers 208A-D without removing or rotating the top portion 200.

The drive 206 of the pusher 100 is activated, and the drive roller 204 pushes the conductor 248 toward an outlet end 252 of the pusher 100. It should be appreciated that the conductors 248 may be fed into the pusher after the drive 206 is activated, though in some embodiments, this may cause damage to the conductors 248 and may, therefore, be avoided. The drive 206 rotates the drive roller 204. As will be explained below in more detail with reference to FIG. 4, the drive roller 204 can be coupled to one or more of the rollers 208A-D via chains, belts, gears, and the like, such that the drive 206 also rotates one or more of the rollers 208A-D. The force generated by the drive 206 and the drive roller 204 pushes the conductors 248 through the pusher 100 and out the outlet end 252 of the pusher 100. From the outlet end 252 of the pusher, the conductors 248 can enter the guiding device 234 and proceed into a conduit or other structure through which the conductors 248 are being fed.

Figure 3B:
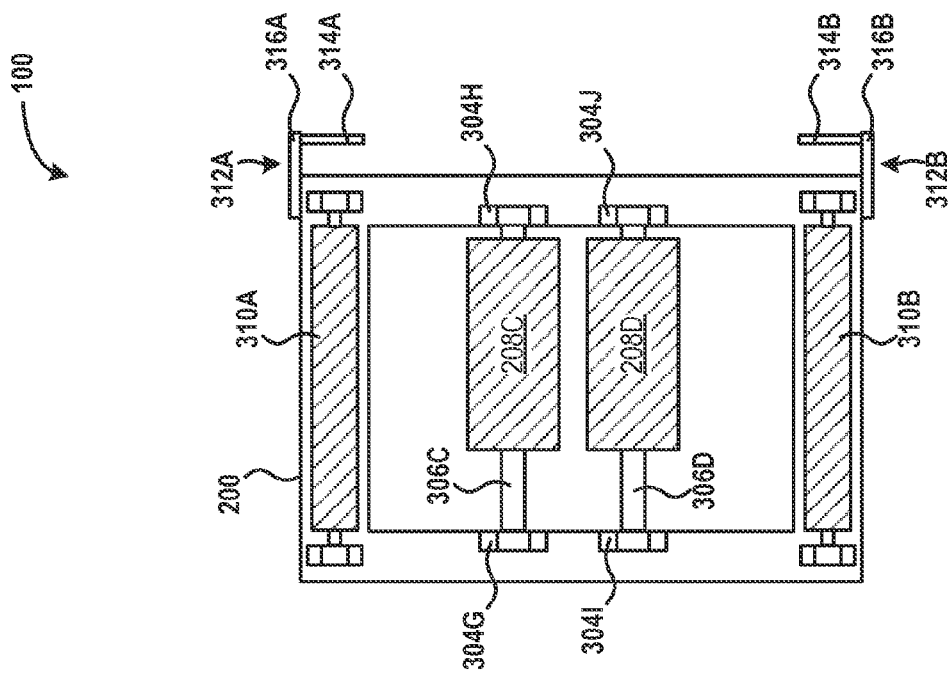
FIG. 3B is a plan drawing illustrating a bottom view of the top portion of the conductor pusher illustrated in FIG. 2, according to an exemplary embodiment.
Figure 3A:
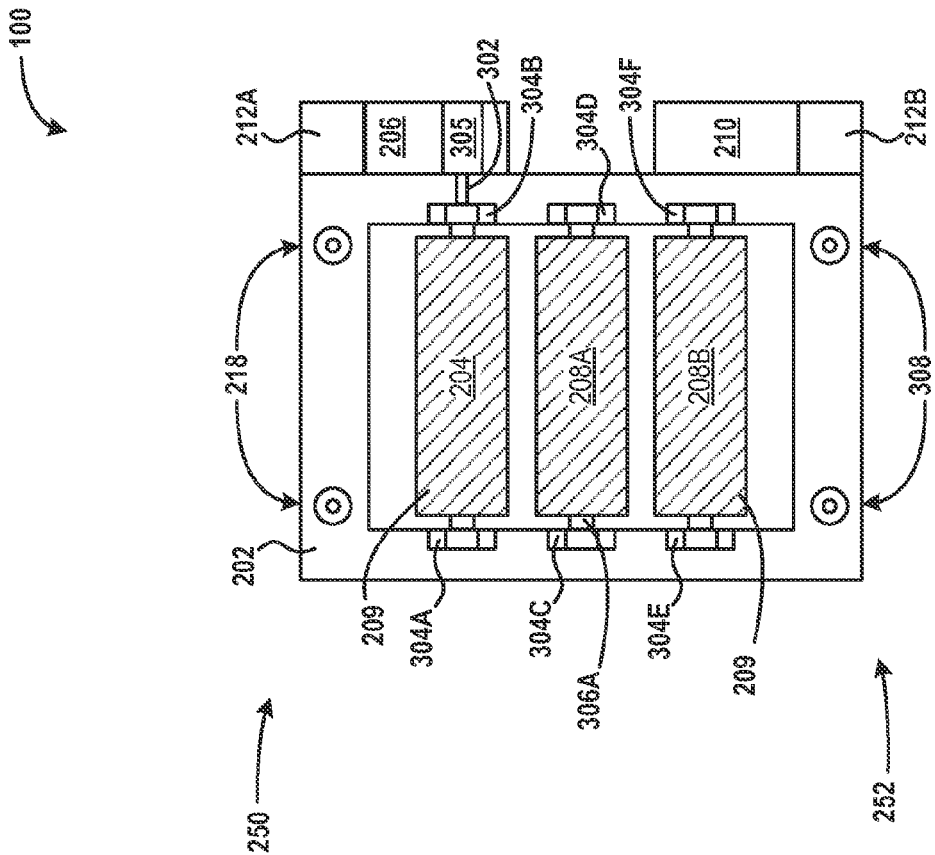
FIG. 3A is a plan drawing illustrating a top view of the bottom portion of the conductor pusher illustrated in FIG. 2, according to an exemplary embodiment.

Turning now to FIGS. 3A-3B, additional details of the pusher 100 and the components thereof will be described in more detail. FIG. 3A is a plan drawing illustrating a top view of the bottom portion 202 of the pusher 100, according to an exemplary embodiment. FIG. 3B is a plan drawing illustrating a bottom view of the top portion 200 of the pusher 100, according to an exemplary embodiment. Some structures of the pusher 100 are not shown or labeled in FIGS. 3A-3B to avoid obscuring the illustrated and described details.

The drive roller 204 and the rollers 208A, 208B are visible. The drive roller 204 can be connected to the bottom portion 202 using any suitable mechanisms. In the illustrated embodiment, the drive roller 204 is placed onto a drive shaft 302, which is connected to the bottom portion 202 by brackets 304A and 304B. The brackets 304A, 304B can include bearings and/or other structures for allowing rotation of the drive shaft 302. The drive shaft 302 passes through the bracket 304B and is coupled to the drive 206 using any suitable mechanisms. In some embodiments, the drive shaft 302 is coupled to a worm gear (not illustrated) within the drive 206, which in turn is connected to a motor 305. This embodiment is exemplary.

The roller 208A is placed onto a shaft 306A, which is connected to the bottom portion 202 by brackets 304C and 304D. The roller 208B is placed onto a shaft 306B, which is connected to the bottom portion 202 by brackets 304E and 304F. The roller 208C is placed onto a shaft 306C, which is connected to the top portion 200 by brackets 304G and 304H. The roller 208D is placed onto a shaft 306D, which is connected to the top portion 200 by brackets 304I and 304J.

The bottom portion 202 also can include guides 308 at the outlet end 252. In some embodiments, the guides 308 are substantially similar to the guides 218 at the inlet end 250, which were described above with reference to FIG. 2. In other embodiments, the guides 308 are not similar to the guides 218. The types of structures and/or devices used for each of the guides 218 and/or 308 can be a selected based upon an intended purpose, design characteristics, and/or performance requirements, among other considerations.

The top portion 200 also can include one or more roller guides 310A and 310B. The roller guides 310A, 310B can be used to provide a smooth surface between the conductors 248 and the surfaces of the top portion 200 to prevent the conductors 248 from getting cut, snagged, or otherwise damaged during movement through the pusher 100. It should be understood that the roller guides 310A, 310B can be replaced by other structures, devices, coatings, surface treatments, paints, and the like, and that similar or identical structures may be placed on the bottom portion 202 in addition to, or instead of, the guides 310A, 310B on the top portion 200.

As mentioned above with reference to FIG. 2, the top portion 200 also can include pivot mechanisms 312A and 312B. The pivot mechanisms 312A, 312B are illustrated in FIG. 3B as pins 314A, 314B that are connected to the top portion 200 via plates 316A and 316B. In some embodiments, the functionality of the pivot mechanisms 312A, 312B is provided by hinges that are connected to the supports 212A, 212B and the top portion 200. In other embodiments, plates or sleeves with apertures are connected to the top portion 200, and a hitchpin, R-clip, linchpin, or the like, is passed through the apertures in the plates, through the through holes 216 of the supports 212A, 212B, and are secured with a rod, pin, bolt, or the like, to prevent or reduce unwanted movement. Thus, it should be understood that the embodiment illustrated in FIG. 3B is exemplary.

Figure 4:
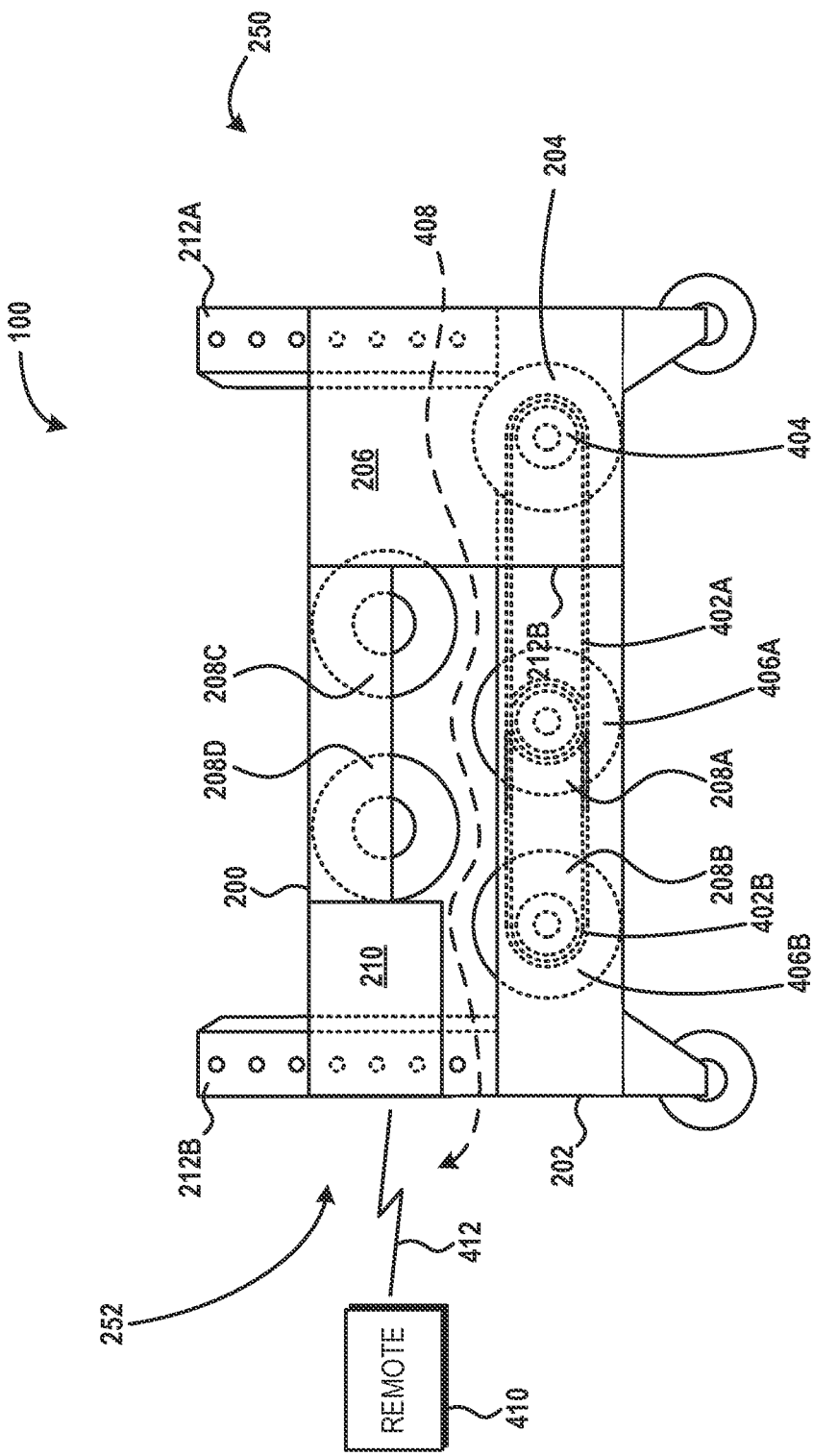
FIG. 4 is a side elevation drawing illustrating a front view of the conductor pusher of FIG. 2, according to an exemplary embodiment.

Turning now to FIG. 4, additional features of the pusher 100 will be described in detail. FIG. 4 illustrates a side elevation view of the pusher 100, according to an exemplary embodiment. Some structures of the pusher 100 are not shown or labeled in FIG. 4 to avoid obscuring the illustrated and described details.

In the view illustrated in FIG. 4, one embodiment of the configuration of the drive roller 204 and the rollers 208A-D can be seen in profile view. In the illustrated embodiment, the drive 206 includes a housing that obscures the view of the drive roller 204. Thus, the drive roller 204 is illustrated with hidden lines.

The drive roller 204 can be connected to the roller 208A by a chain 402A, though a belt, gears, pulleys, and/or other mechanisms can be used in addition to, or instead of, the chain 402A. In the illustrated embodiment, links of the chain 402A interface with cogs of a drive gear 404 on the drive roller 204, and cogs of a gear 406A on the roller 208A. Thus, rotation of the drive roller 204 by the drive 206 results in rotation of the roller 208A. In another embodiment, the chain 402A is replaced with a belt that wraps around pulleys at the drive roller 204 and the roller 208A. Other embodiments are contemplated, but will not be described in detail herein for the sake of brevity.

A second chain 402B interfaces with cogs of the gear 406A on the roller 208A, and cogs of a gear 406B on the roller 208B. It should be understood that the gear 406A can include two sets of cogs, two sets of pulleys, and the like, to simultaneously accommodate the chains 402A, 402B. Additionally, it should be understood that more than one of the rollers 204, 208A-D can be coupled to the drive 206, and that more than two of the rollers 204, 208A-D can be connected by one or more chains 402A, 402B. In one embodiment, for example, the roller 208B is coupled to another drive mechanism (not illustrated), which can be coupled to the roller 208A and the drive roller 204 with a chain, belt, gears, or the like. Thus, the drive mechanism and the drive 206 can be synchronized with one another, and can simultaneously power the roller 208A.

Although not illustrated in FIG. 4, it should be appreciated that the rollers 208C, 208D can include gears or pulleys that can interface with chains, belts, or gears at the bottom portion 202. Thus, the rollers 208C, 208D can be powered by the drive 206 in addition to, or instead of, the rollers 208A, 208B. Therefore, the illustrated embodiment should not be construed as being limiting in any way.

As shown in FIG. 4, the rollers 204, 208A-D can cooperate to form a conductor path 408 along which the conductors 248 (FIG. 2), or bundles thereof, are fed. The conductors 248 are fed through the inlet end 250 along the path 408, through the rollers 204, 208A-D along the path 408, and out the outlet end 252 along the path 408. Exemplary roller paths will be illustrated and described in more detail below with reference to FIGS. 5A-5C.

As mentioned above, the pusher 100 also can communicate with a remote control 410 via a communication link 412. The remote control 410 can include a footswitch or other device for activating the drive 206 of the pusher 100. Although not illustrated in FIG. 4, it should be appreciated that the remote control 410 can include or can be coupled to one or more safety mechanisms such as weight sensors, safety switches, and the like. Thus, a worker remote from the pusher 100 may be required to stand on a weight sensor and activate the remote control 410 before a control signal is communicated to the pusher 100.

The communication link 412 can accommodate wired and/or wireless communications protocols, and can occur over one or more network interfaces such as the network interface 106 described above. The communication link 412 can thus be provided over-the-air ("OTA") or via a wired network and/or direct link. Any suitable wired communications protocols may be used including, but not limited to, TCP/IP, IPv6, MPLS, UDP, combinations thereof, and the like. Similarly, any suitable wireless protocols may be used including, but not limited to, the IEEE 802.11x, 802.16, 802.20, 802.16e, and/or 802.15.x standards, i.e., WIFI, WIMAX, Mobile Broadband Wireless Access (MBWA), Mobile WIMAX, and BLUETOOTH standards, as well as signals transmitted via infrared, IrDA, the ECMA-342 and ECMS 352 standards ("near field communications (NFC)"), other RF signals, combinations thereof, and the like.

Figure 5A:
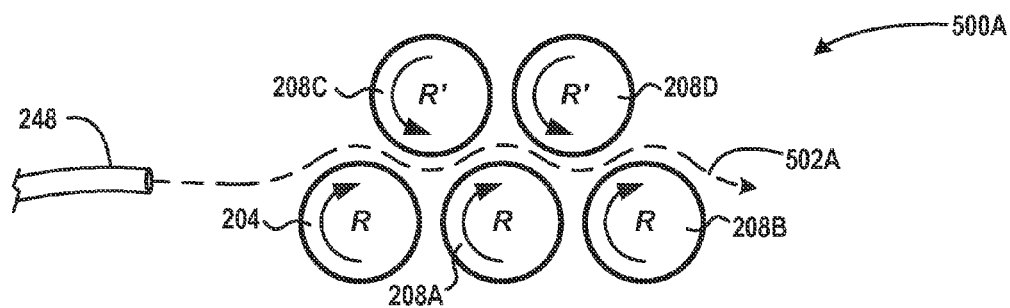
FIGS. 5A-5C are schematic illustrations showing roller configurations and conductor paths, according to exemplary embodiments.
Figure 5B:
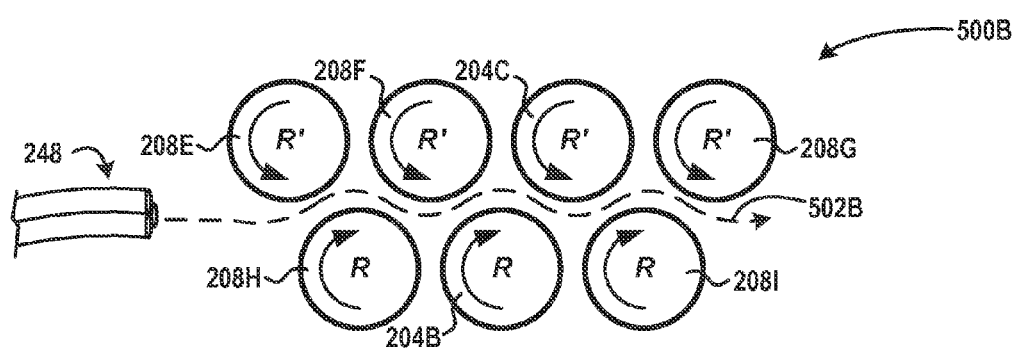
Figure 5C:
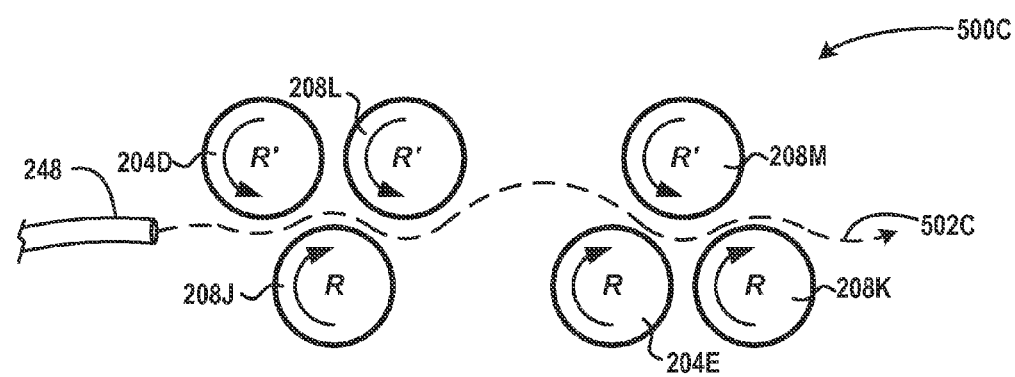

Turning now to FIGS. 5A-5C, additional features of the pusher 100 will be described in detail. FIGS. 5A-5C illustrate roller configurations for the pusher 100, according to exemplary embodiments. It should be understood that the illustrated configurations are illustrative of only some contemplated embodiments. Thus, the illustrated configurations should not be construed as being limiting in any way.

FIG. 5A illustrates a first roller configuration 500A. The roller configuration 500A is substantially similar to the configuration of the rollers 204, 208A-D of the pusher 100 as illustrated in FIGS. 2-4. As shown in FIG. 5A, one or more conductors 248 or bundles of conductors 248 are passed between the rollers 204, 208A-D along a path 502A. The drive roller 204 is coupled to the drive 206. When the drive 206 is activated, the drive roller 204 rotates in the direction R. As explained above, none, some, or all of the rollers 208A-D can be coupled to the drive roller 204, if desired. In the illustrated embodiment, the rollers 208A, 208B rotate in the direction R, and the rollers 208C, 208D rotate in the direction R'.

FIG. 5B illustrates a second roller configuration 500B. In the roller configuration 500B, one or more conductors 248 or bundles of conductors 248 are passed between rollers 204B-C, 208E-I along a path 502B. As shown in FIG. 5B, the pusher 100 can include two or more drive rollers 204B-C, each of which may be coupled to one or more drives such as the drive 206. In the illustrated embodiment, the drive roller 204B is coupled to a first drive (not illustrated), and rotates in the direction R. The drive roller 204C is coupled to a second drive (not illustrated), and rotates in the direction R'. As explained above, none, some, or all of the rollers 208E-I can be coupled to one or more of the drive rollers 204B-C, if desired. In the illustrated embodiment, the rollers 208E-G rotate in the direction R' and the rollers 208H-I rotate in the direction R.

FIG. 5C illustrates a third roller configuration 500C. In the roller configuration 500C, one or more conductors 248 or bundles of conductors 248 are passed between the rollers 204D-E, 208J-M along a path 502C. As shown in FIG. 5C, the pusher 100 can include two or more drive rollers 204D-E, each of which may be coupled to one or more drives such as the drive 206. In the illustrated embodiment, the drive roller 204D is coupled to a first drive (not illustrated), and rotates in the direction R'. The drive roller 204E is coupled to a second drive (not illustrated), and rotates in the direction R. As explained above, none, some, or all of the rollers 208J-M can be coupled to one or more of the drive rollers 204D-E, if desired. In the illustrated embodiment, the rollers 208J, 208K rotate in the direction R and the rollers 208L, 208M rotate in the direction R'.

Figure 6:
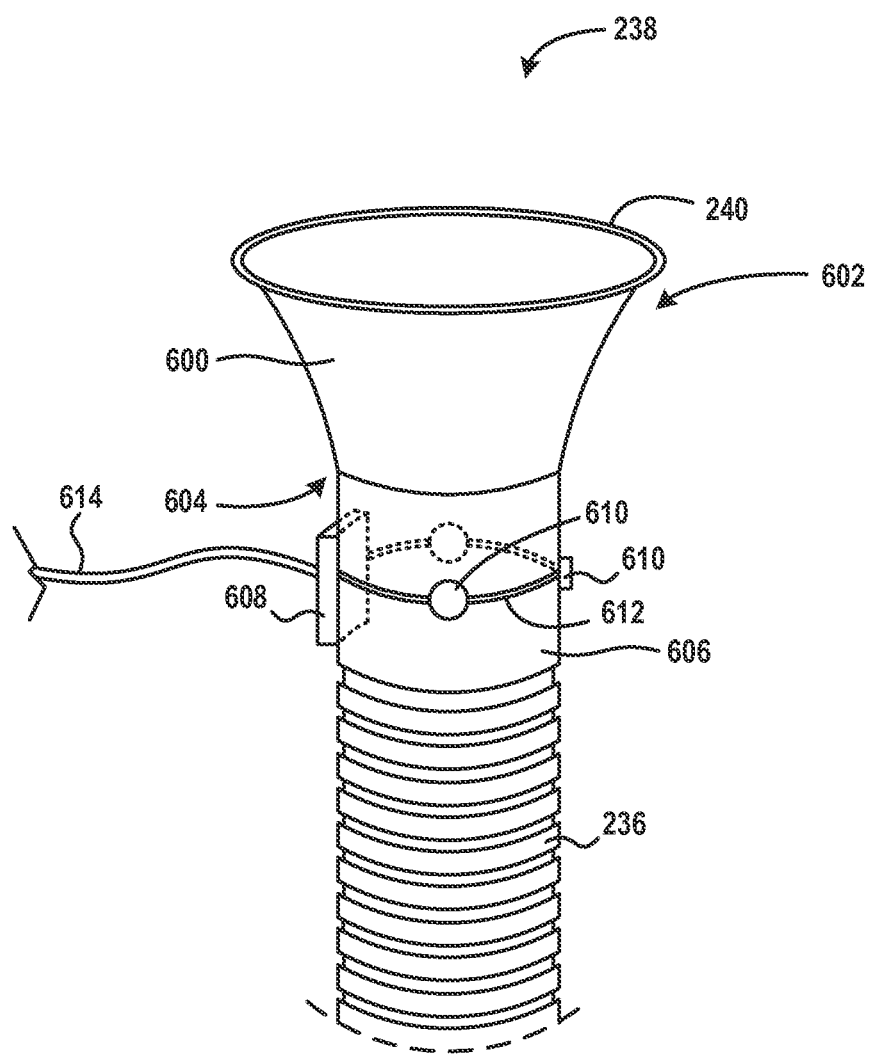
FIG. 6 is a perspective drawing illustrating an inlet of a guiding device, according to an exemplary embodiment.

Turning now to FIG. 6, additional features of the pusher 100 will be described in detail. FIG. 6 is a perspective drawing illustrating the inlet 238 of the guiding device 234, according to an exemplary embodiment. As explained above, the inlet 238 can include a leading edge 240, illustrated in FIG. 6 as a rim. The inlet 238 also includes a throat 600. In the illustrated embodiment, the throat 600 is tapered so that a first end 602 of the throat 600 has a first diameter substantially equal to the inner diameter of the rim, and a second end 604 of the throat 600 has a diameter substantially equal to a diameter of the tube 236. A body 606 can be connected to or formed at the second end 604 of the throat 600, and can connect to the tube 236 of the guiding device 234. The inlet 238 can be formed from a single piece of material, or can be a composite structure formed from two or more components.

As mentioned above, the guiding device 234 can include an outlet assembly 244 that is configured to connect to a conduit. The guiding device 234 can be used to eliminate the need for manpower between the pusher 100 and a conduit or other structure into which the conductors 248 are fed, or can at least reduce the amount of manpower needed between the pusher 100 and a conduit or other structure. In some embodiments, the body 606 connects directly to a conduit instead of the tube 236. Additionally, some or all of the edges of the inlet 238 can be smooth or polished to reduce friction between the surfaces of the inlet 238 and the conductors 248 during feeding. Furthermore, the materials used to form the inlet 238 can be varied to reduce friction, if desired. For example, the inlet 238 can be coated or impregnated with any desired materials to provide reduced friction or for other purposes.

In some embodiments, the inlet 238, the tube 236, and/or the outlet assembly 244 includes a lubrication mechanism 608 for applying lubricant to the conductors 248 as the conductors 248 are fed into the tube 236 and/or into a conduit (not illustrated). The lubrication mechanism 608 supplies a lubricant to one or more spray heads 610 disposed in the body 606. Lubricants can be supplied to the spray heads 610 via lubrication lines 612. In some embodiments, the lubrication mechanism 608 receives lubrication via a supply line 614. The supply line 614 can be pressurized, and/or the lubrication mechanism 608 can include a pump to pressurize the lubrication for delivery to the spray heads 610. In some embodiments, the amount of lubrication applied to the conductors 248 is such that the supply line 614 may be omitted, and the lubrication mechanism 608 can include a self-contained tank for the lubricant. These embodiments are exemplary, and should not be construed as being limiting in any way.

Figure 7:
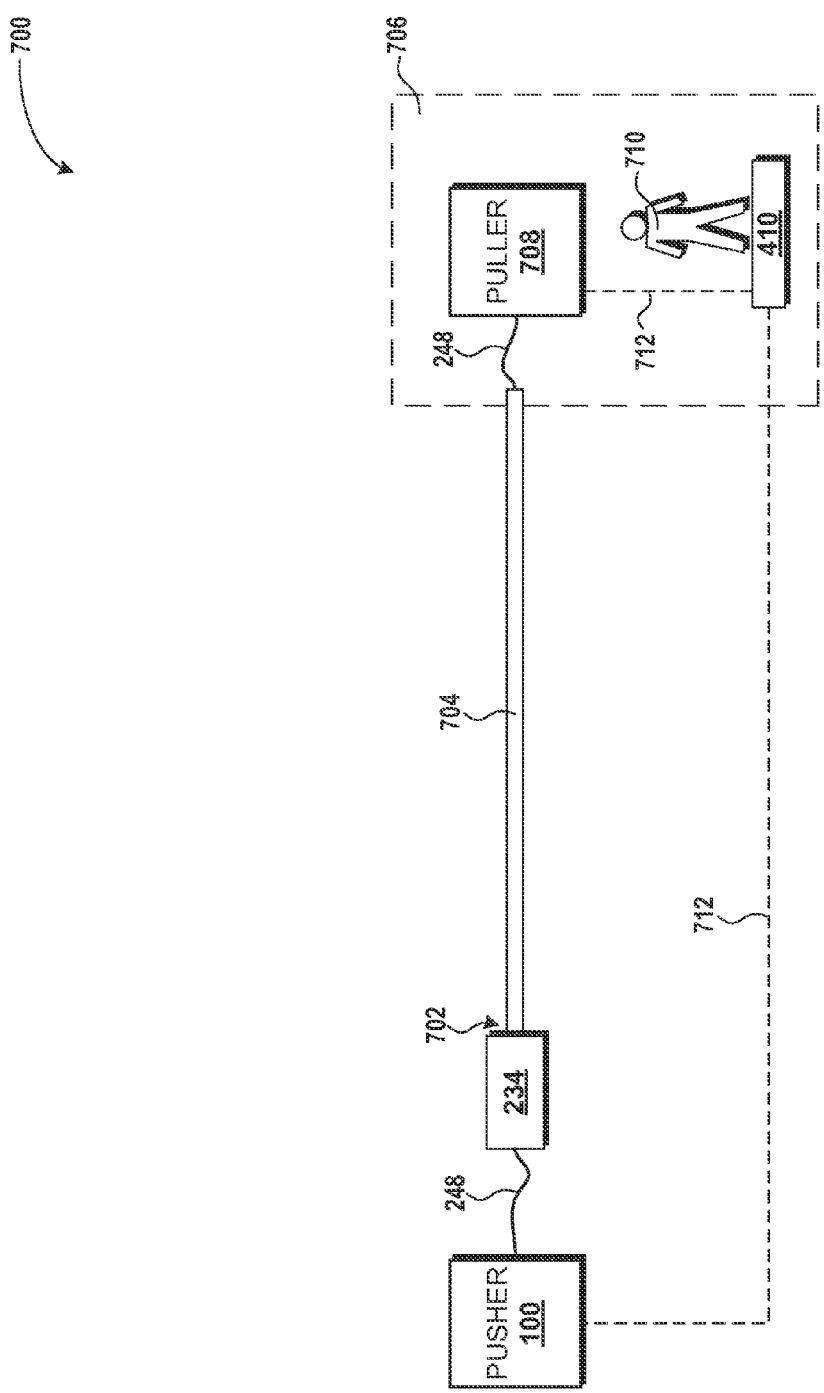
FIG. 7 is a schematic block diagram illustrating an operating environment for using the pusher, according to an exemplary embodiment.

Turning now to FIG. 7, an operating environment 700 for the pusher 100 will be described in detail. The pusher 100 is located at a feed end 702 of a conduit 704. The pusher 100 pushes one or more conductors 248 into the conduit 704 via the guiding device 234. As explained above, the guiding device 234 can lubricate the conductors 248, if desired. In some embodiments, the conductors 248 include a "no-lube" coating or sheath, or require no lubrication or "no-lube" coatings. The conductors 248 pass through the conduit 704 and arrive at a destination 706. In some embodiments, a puller 708 is located at the destination 706. The puller 708 can be configured to pull the conductors 248 in concert with the pusher 100. In other embodiments, a second pusher 100 is located at the destination 706, and is configured to push the conductors 248 onto a spool, into a coil, into a pile, into a second conduit, or elsewhere.

The use of a puller 708 and/or a second pusher 100 at the destination 706 can reduce strain and/or stresses on the conductors 248. For example, the use of a puller 708 can cause strains or stresses on the conductors 248 when the conductors 248 snag or get caught in the conduit 704 or elsewhere. Similarly, the pusher 100 can cause strains or stresses on the conductors 248 during feeding. Thus, a pusher 100 and a puller 708 and/or a second pusher 100 can reduce strains and stresses by applying a pulling force on one end of the conductors 248 at the same time as an equal pushing force is applied to another end of the conductors 248. While such benefits are possible in some embodiments, it should be understood that these benefits are not always recognized as a result of employing an operating environment similar to that illustrated in FIG. 7. Thus, the above benefits should not be construed as limiting in any way the scope of the disclosure and/or the claims.

An operator 710 can be located proximate to the destination 706 and/or elsewhere in the operating environment 700. As shown in FIG. 7, the operator 710 controls the remote control 410, which sends control signals 712 to one or more pushers 100 and/or pullers 708. Thus, the pusher 100 can be used as a "dead man" at a feed end, if desired, and can be controlled remotely by the operator 710 or another entity. In some embodiments, the ability to control one or more pushers 100 and/or pullers 708 can provide a safer work environment, and can eliminate the need for operators on one or more ends of the conduit 704.

The subject matter described above is provided by way of illustration only and should not be construed as limiting. Various modifications and changes may be made to the subject matter described herein without following the example embodiments and applications illustrated and described, and without departing from the true spirit and scope of the claimed subject matter, which is set forth in the following claims.

We claim:

1. A conductor pusher for pushing a conductor toward a structure, the conductor pusher comprising:
    a bottom portion comprising a support;
    a drive roller located at the bottom portion;
    a top portion connected to the support by a pivot mechanism;
    a motor that drives the drive roller;
    a controller that selectively activates the motor;
    at least one roller located at the top portion, wherein the at least one roller cooperates with the drive roller to apply a force to the conductor to push the conductor through the conductor pusher and along a conductor path toward the structure; and
    at least one pair of guides located at one or more of the top portion or the bottom portion, wherein at least one guide of the at least one pair of guides comprises a further roller.

2. The conductor pusher of claim 1, wherein at least one of the drive roller or the at least one roller comprises a grooved roller.

3. The conductor pusher of claim 1, wherein the drive roller engages a first side of the conductor, and wherein the at least one roller engages a second side of the conductor.

4. The conductor pusher of claim 1, wherein the at least one pair of guides comprises two pairs of guides.

5. The conductor pusher of claim 4, wherein a first pair of the two pairs of guides is located at an inlet end of the conductor pusher, and wherein a second pair of the two pairs of guides is located at an outlet end of the conductor pusher.

6. A method comprising:
    locating a conductor along a conductor path that passes through a conductor pusher, the conductor pusher comprising
    a bottom portion comprising a support;
    a drive roller located at the bottom portion;
    a top portion connected to the support by a pivot mechanism;
    a motor that drives the drive roller,
    a controller that selectively activates the motor,
    at least one roller located at the top portion, wherein the at least one roller cooperates with the drive roller to apply a force to the conductor to push the conductor through the conductor pusher and along the conductor path toward a structure;
    at least one pair of guides located at one or more of the top portion or the bottom portion, wherein at least one guide of the at least one pair of guides comprises a further roller; and
    activating the conductor pusher to push the conductor along the conductor path toward the structure.

7. The method of claim 6, wherein locating the conductor along the conductor path comprises:
    rotating the top portion along an axis that is at least partially formed by the pivot mechanism; and
    locating the conductor along the conductor path.

8. The method of claim 7, further comprising:
    adjusting a tension between the top portion and the bottom portion by way of an adjustment mechanism.

9. The method of claim 8, wherein the adjustment mechanism comprises a threaded portion that passes through a plate on the top portion and engages a sleeve on the bottom portion.

10. The method of claim 9, wherein at least one of the drive roller or the at least one roller comprises a grooved roller.

11. The method of claim 6, wherein the conductor passes between the drive roller and the at least one roller, wherein the drive roller engages a first side of the conductor, and wherein the at least one roller engages a second side of the conductor.

12. The method of claim 6, wherein the at least one pair of guides comprises two pairs of guides.

13. The method of claim 12, wherein a first pair of the two pairs of guides is located at an inlet end of the conductor pusher, and wherein a second pair of the two pairs of guides is located at an outlet end of the conductor pusher.

14. A system comprising:
    a conductor pusher comprising a bottom portion that comprises a support, a top portion connected to the support by a pivot mechanism, a drive roller located at the bottom portion, a motor that drives the drive roller, a controller that selectively activates the motor, at least one roller located at the top portion, wherein the at least one roller cooperates with the drive roller to apply a force to a conductor to push the conductor through the conductor pusher and along a conductor path toward a structure, and at least one pair of guides located at one or more of the top portion or the bottom portion, wherein at least one guide of the at least one pair of guides comprises a further roller; and
    a puller that pulls the conductor while the conductor pusher pushes the conductor, wherein the puller pulls the conductor by applying a pulling force to the conductor while the conductor pusher applies a pushing force to the conductor.

15. The system of claim 14, further comprising a remote control for selectively and simultaneously activating and deactivating the conductor pusher and the puller.

16. The system of claim 14, wherein at least one of the drive roller or the at least one roller comprises a grooved roller.

17. The system of claim 14, wherein the conductor passes between the drive roller and the at least one roller, wherein the drive roller engages a first side of the conductor, and wherein the at least one roller engages a second side of the conductor.

18. The system of claim 14, wherein the at least one pair of guides comprises two pairs of guides.

19. The system of claim 18, wherein a first pair of the two pairs of guides is located at an inlet end of the conductor pusher, and wherein a second pair of the two pairs of guides is located at an outlet end of the conductor pusher.

* * * * *